INVENTOR
JOHN J. SCHACHTE
ATTORNEY
Cyril M. Hajewski

INVENTOR
JOHN J. SCHACHTE
ATTORNEY
Cyril M. Hajewski

INVENTOR.
JOHN J. SCHACHTE
ATTORNEY

United States Patent Office 3,483,767
Patented Dec. 16, 1969

3,483,767
APPARATUS FOR ANGULARLY POSITIONING A SPINDLE
John J. Schachte, Wauwatosa, Wis., assignor to Kearney & Trecker Corporation, West Allis, Wis., a corporation of Wisconsin
Filed Sept. 15, 1967, Ser. No. 667,993
Int. Cl. F16h 35/06, 37/06
U.S. Cl. 74—395                            11 Claims

ABSTRACT OF THE DISCLOSURE

An apparatus for angularly orienting a rotary spindle in a predetermined position upon discontinuation of its rotation. A conventional drive mechanism is provided for rotating the spindle in a work operation but a separate servo drive takes over from the work drive to effect the angular positioning of the spindle.

BACKGROUND OF THE INVENTION

This invention relates generally to a mechanism for orienting a rotary spindle in a predetermined angular position upon discontinuation of its rotation. The angular orientation of the spindle is achieved by a separate servo drive that operates solely for effecting the angular positioning of the spindle. An independent drive mechanism is provided for rotating the spindle in a work operation and this independent drive mechanism is rendered inoperable when the positioning movement is being effected by the servo drive.

In machine tool construction it is frequently necessary to accurately position a rotary spindle in a predetermined angularly oriented position. This accurate positioning is needed for a variety of purposes. For example, in a lathe, a workpiece supporting spindle may have to be oriented for proper alignment between the spindle and the workpiece during a transfer and also for positioning the workpiece in a selected angular position relative to a tool operator so that a certain machining operation may be done on it by the tool operator. Before this invention, a common drive means was used to rotate the spindle in both the work operation and to angularly position the workpiece spindle. By using the same drive means to position the workpiece spindle as was used to perform the work operation, precise angular orientation was difficult if not impossible to obtain. This was due to the relatively large components needed to drive the spindle during a work or "turning" operation. The present invention teaches the use of a separate accurate servo drive arrangement which enables the spindle to be located in a desired predetermined angularly oriented position with a high degree of accuracy.

SUMMARY OF THE INVENTION

According to this invention, there is provided an improved workpiece spindle for a lathe having two separate rotary drive means. The first drive means is used to rotate the spindle in a work or "turning" operation. The second drive means is connectable to the spindle and is used to position the spindle in a desired predetermined angularly oriented position. In the first or "turning" mode of operation, the workpiece spindle is connected to a motor through hydraulic clutches and a shiftable speed range gear box. The hydraulic clutches provide power transmission, two directions of spindle rotation and a creep rotation which rotates the spindle at a low rate of speed. On the other hand, when it is desired to locate the spindle in a predetermined angularly oriented position, the spindle is disengaged from the first drive means and connected to a servo controlled hydraulic motor through a 180:1 reduction speroid gear set and an engageable gear drive unit which operates as a drive coupling located at the rear of the workpiece spindle. The second or servo drive means is connected to the workpiece spindle by shifting axially a movable gear member of a gear drive unit, which is attached to a shifting fork, into engagement with the axially stationary gear member of the gear drive unit secured to the rear of the workpiece spindle. The axial shifting of the movable gear member is effected by a hydraulic actuator.

It is the general object of this invention to provide a workpiece spindle which can put the workpiece in a desired predetermined angularly oriented position and then to rotate the spindle in a machining operation.

It is a further object of this invention to provide a workpiece spindle which uses a separate drive means, independent of the turning drive means, to position the workpiece in a desired angular position.

It is a further object of this invention to provide means for disengaging the first or "turning" drive means and to provide for coupling means for engaging the second or "positioning" drive means to the workpiece spindle.

DESCRIPTION OF THE PREFERRED EMBODIMENTS

Figure 1:
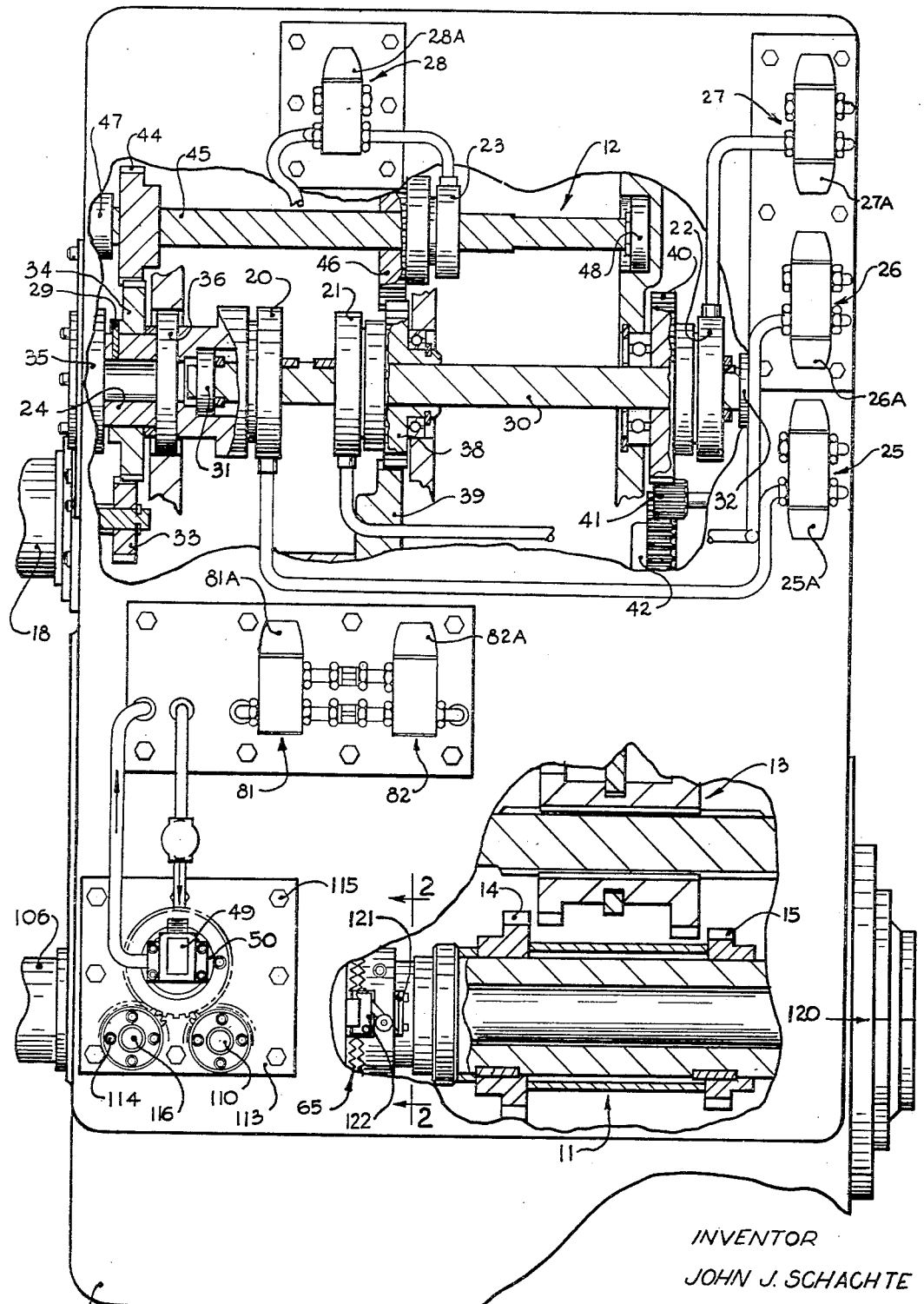
FIGURE 1 is a plan view of a workpiece spindle headstock incorporating the future of the present invention, with parts broken away to reveal the drive mechanism.

Referring now to the drawings, and more specifically to FIG. 1 thereof, illustrating a lathe headstock incorporating the features of the present invention, the machine comprises generally a workpiece spindle headstock housing 10 which is supported on the usual bed structure (not shown) in a well-known manner. A power driven workpiece supporting spindle, generally indicated by reference number 11, is rotatably supported in the headstock housing 10.

The workpiece spindle 11 of the lathe is adapted to be driven in either one of two separate rotary drive modes; a turning mode and a servo positioning mode. The servo positioning mode is utilized for angularly orienting the workpiece spindle 11 to a predetermined desired angular position as well as indexing the workpiece spindle 11 in the lathe. The predetermined desired angular position of the spindle is needed for a transfer of a workpiece to the spindle so as to have proper alignment between the workpiece and the spindle, and also for positioning the workpiece in a selected angularly oriented position so a certain machining operation may be done on it by a tool operator (not shown).

In a work operation or turning mode the workpiece spindle 11 is driven at a selected one of a plurality of speeds through the operation of a selectively shiftable transmission 12 carried within the headstock housing 10. The output of the transmission 12 is transmitted to the workpiece spindle 11 via a range change gear cluster 13. The gear cluster 13 is selectively shiftable into meshed engagement with one or another of a pair of spindle drive gears 14 and 15 that are secured to the workpiece spindle 11 for rotation therewith. Power for driving the workpiece spindle 11 at a selected speed is obtained from a motor 18 mounted on the spindle headstock housing 10. The output of the drive motor 18 is transmitted to the transmission 12 through the operation of a series of hydraulic clutches. Drive clutch 20 transmits power from the motor 18 for rotating the spindle 11. Counterclockwise clutch 21 and clockwise clutch 22 establish the direction of workpiece spindle 11 rotation selectively. And finally a creep clutch 23 provides the spindle with a low speed rotation. The hydraulic clutches operate in a well-known manner. For example, by energizing the creep clutch solenoid 28A, associated with a control valve 28, hydraulic pressure from a source (not shown) is supplied to the creep clutch 23 effecting the engagement of the clutch. The clutch 23 will disengage when the solenoid 28A, associated with the control valve 28, is deenergized and the hydraulic fluid is connected to a reservoir (not shown).

In a turning mode of operation the workpiece spindle drive motor 18 is running at all times. To effect rotation of the workpiece spindle 11, the drive clutch 20 will be actuated in combination with one or the other of the directional clutches 21 or 22 depending upon the direction desired for workpiece spindle rotation. With the drive clutch 20 engaged by operation of a solenoid actuated valve 25, a shaft 30, which is rotatably supported by bearings 31 and 32, is connected to the spindle drive motor 18 through a motor gear 33 meshed with a gear 34, which is rotatably supported by bearings 35 and 36 and is connected by a pin 29 to drive a sleeve 24 which is coupled to the driven elements of the clutch 20. With the drive clutch 20 engaged, the shaft 30 will be rotated by the motor 18 and the power may be transmitted selectively from the shaft 30 through either the counterclockwise clutch 21 or the clockwise clutch 22 depending upon the direction of rotation desired for the spindle 11. When the directional counterclockwise clutch 21 is actuated by energizing a solenoid 26A associated with control valve 26, power will be transmitted from shaft 30 through counterclockwise directional clutch 21 to gear 38. Power from gear 38 will be transmitted to meshed gear 39 and thence through associated shiftable gears (not shown) to range change gear cluster 13, for driving the workpiece spindle 11 in a counterclockwise rotation and at a selected speed as established by the gear transmission 12. On the other hand, deenergization of the solenoid 26A serves to deactuate the valve 26 for disengaging the counterclockwise directional clutch 21 so that the spindle 11 may be rotated in a clockwise direction. To this end, the clockwise directional clutch 22 is engaged by energizing a solenoid 27A associated with a control valve 27. Thereupon the drive from the motor 18 is transmitted through the drive clutch 20 to shaft 30 and by operation of the engaged clockwise directional clutch 22 to gear 40. Rotational drive from the gear 40 is transmitted to idler gear 41 and via idler gear 41 to meshed gear 42. The power drive from the gear 42 will then again be transmitted through associated shiftable gears (not shown) to range change gear cluster 13 to effect the clockwise rotation of workpiece spindle 11.

The workpiece spindle 11 can also be rotated in a creep speed by disengaging the drive clutch 20 plus the two directional clutches 21 and 22, and engaging the creep clutch 23. It is desired to rotate the workpiece spindle 11 at a creep speed whenever it is desired to change spindle speeds by shifting the gears in the transmission 12. The creep rotation facilitates the shifting of the gears in the transmission 12 into meshing engagement when a speed change is called for. Engagement of the creep clutch 23 is effected by energizing a solenoid 28A associated with a control valve 28. With the creep clutch 23 engaged, power from the motor 18 will be transmitted to gear 34 and via gear 34 to a gear 44 which is keyed to a creep shaft 45. A gear 46 will turn with creep shaft 45 through the energized creep clutch 23. Gear 46 is meshed with gear 38 which will turn gear 39. Gear 39 will turn the shiftable range change gear cluster 13 through a series of associated gears (not shown) which will effect the rotation of the workpiece spindle 11 at a relatively low speed. Creep shaft 45 is rotatably supported by bearings 47 and 48.

Figure 3:
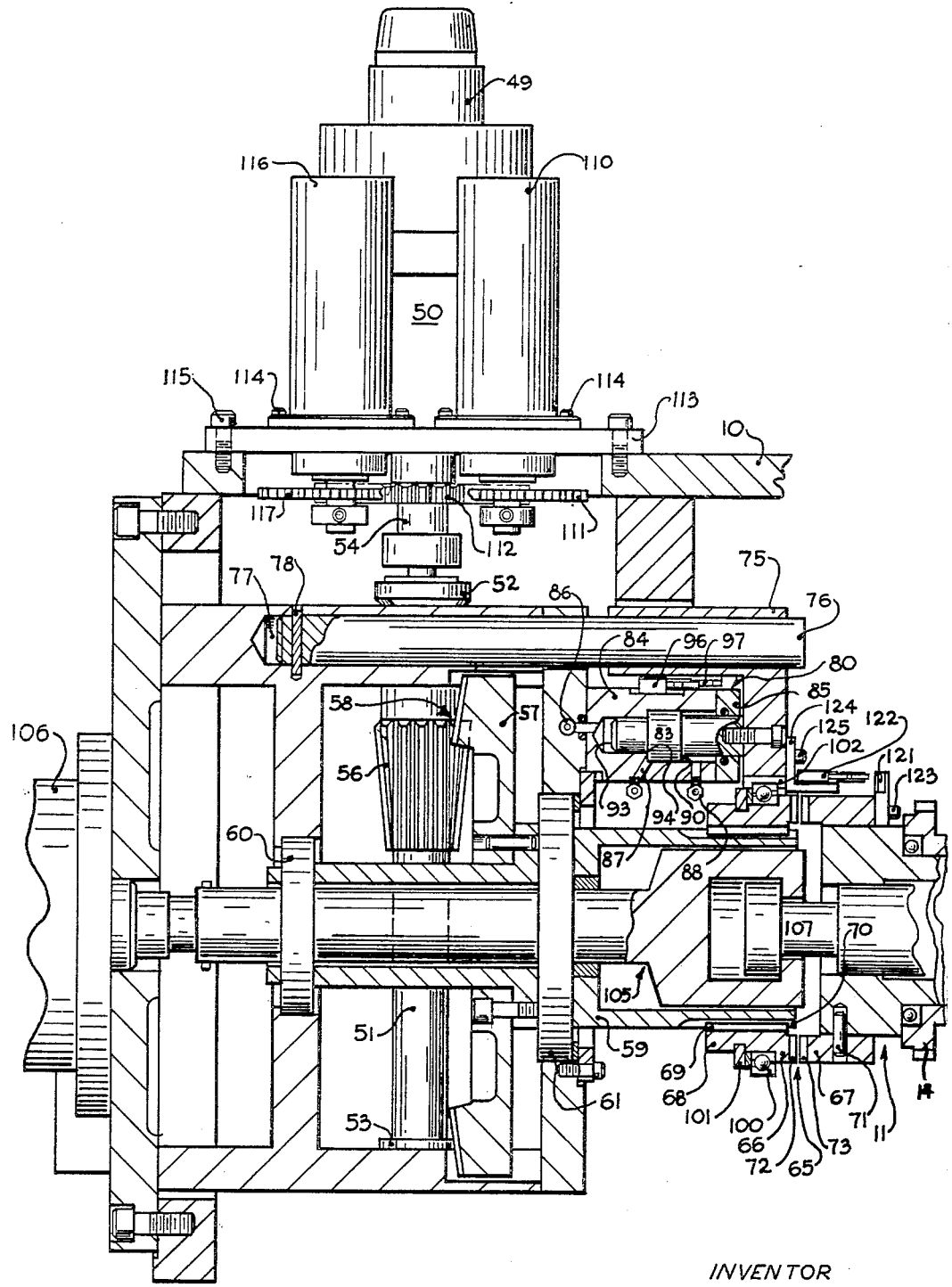
FIG. 3 is an enlarged fragmentary view, partly in elevation and partly in vertical section, taken along the plane represented by the line 3—3 in FIG. 2, through the workpiece spindle headstock.

When it is desired to locate the workpiece spindle 11 in a predetermined angularly orientated position, the spindle 11 is disengaged from the "turning" drive means and connected to a servo positioning drive means illustrated in FIG. 3. The disengaging of the "turning" drive means and the connecting of the servo positioning means is effected either by manual operation of the controls or by automatic operation using tape or punch-card control. The change from a "turning" drive mode to a positioning drive mode is called for whenever it is desired to position the spindle 11 in a predetermined angularly orientated position. Predetermined angularly orientated position is desired to obtain proper alignment between the spindle 11 and a workpiece during a workpiece transfer and also for positioning the workpiece in any selected angular position relative to a tool operator (not shown), so that a certain machining operation may be done on the workpiece by the tool operator (not shown). In the servo positioning mode of operation, the workpiece spindle 11 is connected to be driven by a hydraulic motor 50 that is regulated in its operation by a servo valve 49, shown in FIG. 3. This connection is effected through a 180:1 reduction spiroid gear set, indicated generally by the reference number 58, and an engageable gear drive mechanism, indicated generally by the reference number 65. The gear drive mechanism 65 is located at the rear of the workpiece spindle 11 and may be engaged for connecting the drive from the motor 50 to the spindle 11.

The servo controlled hydraulic motor 50 rotates a vertical shaft 51, which is rotatably supported by bearings 52 and 53. Shaft 51 is coupled to the hydraulic motor shaft (not shown) by coupling 54. The 180:1 reduction spiroid gear set is comprised of a gear 56 keyed on the vertical shaft 51 and a ring gear 57 which is secured on a sleeve 59 that is rotatably supported in bearings 60 and 61. As the hydraulic motor 50 is energized, the shaft 51 is rotated to drive the gear 56 which is meshed with gear 57. Rotation of gear 57 will effect rotation of the sleeve 59, which will make one revolution for every 180 revolutions of the shaft 51. On the right end of the sleeve 59 is secured a shiftable clutch or gear member 66, which constitutes one-half of the clutch gear drive mechanism 65. Another clutch or gear member 67 constituting the other one-half of the gear drive mechanism 65 is secured on the workpiece spindle 11. The gear members 65 and 67 are constructed with a plurality of circumferentially spaced axially extended teeth which have extremely accurate tooth-to-tooth spacing that is a multiple of 2°.

The shiftable gear member 66 is provided with an axially extending tubular collar or sleeve 68 having internal splines 69. The splines 69 are slidably engaged with complementary splines 70 that are found on the rightwardly extending end of sleeve 59. The splines 69 and 70 provide a rotary drive connection between collar 68 with its associated ring gear 66 and the sleeve 59. The splines operate to key collar 68 to the sleeve 59 so it cannot revolve about the perimeter of the sleeve but does allow the gear member 66 to move axially on the sleeve 59. The gear member 67 is secured to the workpiece spindle 11 by a pin 71.

Figure 2:
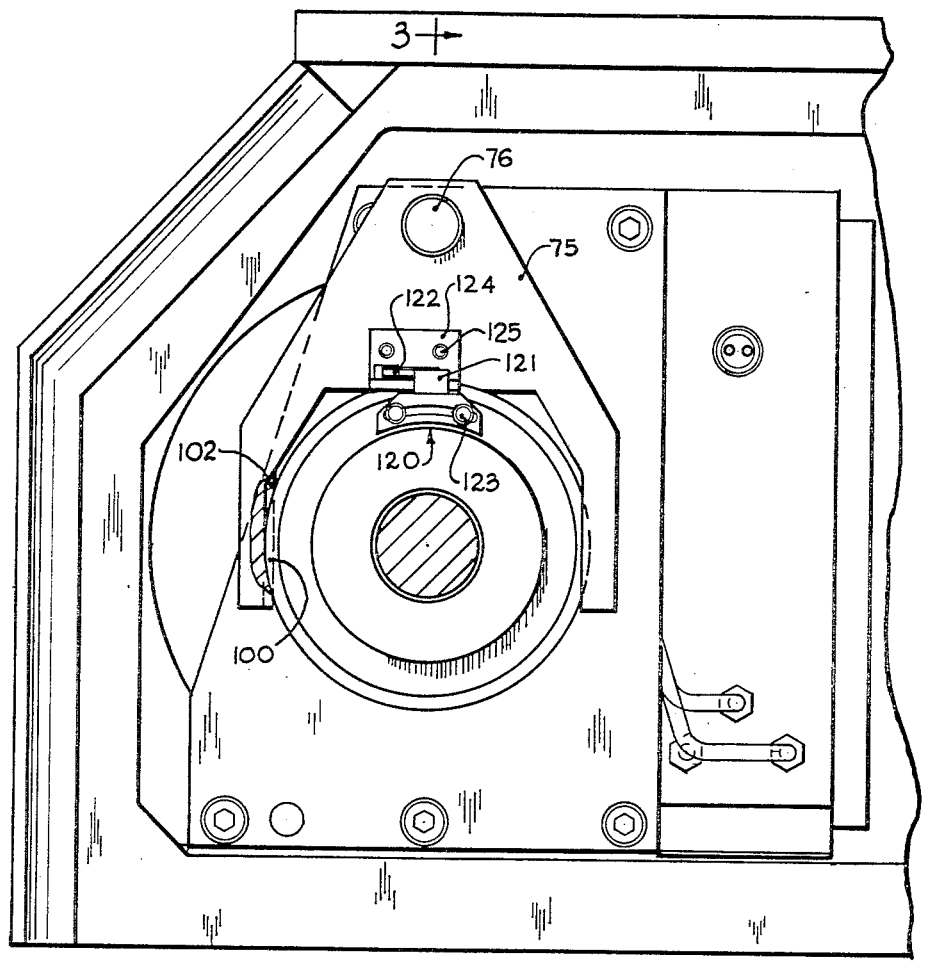
FIG. 2 is a view partly in elevation and partly in section taken along the plane represented by the line 2—2 in FIG. 1, with parts broken away to show the engagement of the shifting fork to the movable ring gear of the gear drive unit.

In the servo positioning mode of operation the gear member 67 is engaged by gear member 66 by the actuation of a shift fork 75. The shifting fork 75, shown in FIGS. 2 and 3, is slidably supported by rod 76. Rod 76 is secured in a bore 77 formed in a horizontal plate member of the housing 10 by a pin 78. Movement of the shifting fork 75 on the rod 76 is effected by operation of a hydraulic actuator 80. The hydraulic actuator 80 is energized by hydraulic pressure under the control of two solenoid valves 81 and 82, depicted in FIG. 1. The movement of the shifting fork 75 is parallel to the axis of the workpiece spindle 11. The hydraulic actuator is comprised of a piston 83, a cylinder 84 and a closure cap 85. The cylinder 84 is provided with three ports 86, 87 and 88. Port 88 is connected so that a constant hydraulic pressure is always kept on a piston surface 90 to keep the piston biased to the left and consequently to keep the two gear members 66 and 67 of the gear drive mechanism 65 from being engaged. Hydraulic fluid to port 86 is controlled by solenoid valve 81 and hydraulic fluid to port 87 is controlled by solenoid valve 82. When it is desired to change from a turning mode of operation to a servo positioning mode of operation, solenoid 82A will be energized, which, in turn, will effect the operation of valve 82 for supplying hydraulic fluid at tank pressure through port 87 to the piston surface 94 which is of larger area than piston surface 90. Since the area of the surface 94 is larger than the area of the surface 90, and since the hydraulic fluid supplied to port 87 is at the same pressure as the hydraulic fluid which is supplied to the port 88, a greater force will be developed on the left side of the piston 83. The somewhat larger force acting on the surface 94 will overcome the leftward biasing force of the hydraulic pressure from port 88 acting on surface 90 and the piston 83 will move axially to the right under a relatively light force. The two gear members 66 and 67 of the gear drive mechanism 65 will now engage under the influence of the relatively light rightwardly acting force. The movable gear member 66 will rotate against the face of gear member 67 until the circumferentially spaced axially extending complementary teeth 72 and 73 of the members 66 and 67, respectively, are in complete alignment. The gear members 66 and 67 will then mesh, and a limit switch 96 will be actuated by a dog 97. The limit switch 96 is secured on the cylinder 84 of hydraulic actuator 80, as shown in FIG. 2. The switch actuating dog 97 is mounted on the shifting fork 75, and when the shifting fork 75 has traveled far enough to establish the full meshing engagement of the teeth 72 and 73 of gear members 66 and 67, respectively, the dog will be in position to actuate the switch 96. Actuation of the limit switch 96 will effect the energization of the solenoid 81A which, in turn, will effect the operation of valve 81 for supplying hydraulic fluid through port 86 to piston surface 93 of piston 83. The hydraulic pressure on piston surface 93 combined with the hydraulic pressure on piston surface 94 will exert a force on piston 83 to keep the shifting fork 75 moved axially to the right thereby keeping gear members 66 and 67 of the gear drive mechanism 65 solidly in mesh, while the servo hydraulic motor 50 operates to position the workpiece spindle 11.

The collar 68 is connected to shifting fork 75 by a bearing 100, which is held on the collar 68 by a snap ring 101. The outer race of bearing 100 is engaged in groove 102 formed in the interior surfaces of the shifting fork 75. The collar 68 of gear member 66 and the shifting fork 75 are separated by the bearing itself. Therefore, the collar 68 will be allowed to turn with the sleeve 59 while the sleeve 59 is coupled to the workpiece spindle 11 by the gear drive mechanism 65 and the shifting fork 75 remains stationary.

As shown in FIG. 3, a workpiece locking rod mechanism is indicated by general reference number 105. The locking rod mechanism is actuated by a hydraulic actuator 106. FIG. 3 shows the hydraulic actuator 106 actuated in a workpiece release position with a workpiece locking rod 107 drawn axially to the left. When the hydraulic actuator 106 is released, a set of springs (not shown) returns the locking rod 107 axially to the right effecting the locking of the workpiece in the spindle. Since the locking mechanism is not per se part of the invention, it will not be discussed further. For a more complete description of a workpiece locking mechanism, reference may be had to patent application of Randall et al., Ser. No. 641,435, filed May 22, 1967.

A resolver 110, shown in FIG. 3, which operates to provide a feedback signal to indicate actual angular position of the workpiece spindle 11, is coupled 1:1 by its gear 111 to a gear 112 secured on the servo hydraulic motor shaft. The resolver 110 is secured to a mounting plate 113 by screws 114. The mounting plate 113, in turn, is mounted on headstock housing 10 by screws 115. For one revolution of the hydraulic motor 50 the resolver output shaft is driven one revolution. For every 180 turns of the hydraulic motor 50 the workpiece spindle 11, through the spiroid reduction gear 58 and gear drive mechanism 65, will turn once. Thus, every revolution of the resolver 110 represents an angular increment of two (2) degrees.

A tachometer 116 is also coupled by a gear 117 to the gear 112 mounted on the servo hydraulic motor shaft. Tachometer 116 operates to improve the dynamic performance of the control system, illustrated in FIG. 5.

A "0" reference or "keylock" position is provided and is an arbitrarily established position which may be conveniently established as any desired angular position for the workpiece spindle 11. In this particular illustration, the "0" reference or "keylock" position is indicated by marks 120 provided on the spindle 11 and the housing 10. When the marks are in registration, as shown in FIG. 1, the spindle 11 is in the "0" reference position. The "0" reference position is provided so that a workpiece (not shown) may be secured to the workpiece spindle 11 in predetermined desired angular relationship thereto so as to facilitate an automatic transfer of a workpiece to the spindle wherein identical alignment between each workpiece and the spindle 11 will be maintained. Also, with the "0" reference position provided, and with a workpiece orientated on the spindle 11 with respect to the spindle "0" reference mark 120, the spindle 11 may be indexed to any selected angular position relative to the "0" reference mark 120 on the housing 10. With this provision the workpiece carried by the spindle 11 can be positioned at a desired angular position with respect to the tool operator (not shown) to have a particular work operation performed thereon.

For each revolution of the resolver 110 a "null" signal will be produced. However, the "null" signal produced by the resolver may or may not be the "null" signal produced when the spindle 11 is at "0" reference position. It will be recalled that the resolver 110 is driven to make 180 revolutions for each revolution of the spindle 11. Therefore, each revolution of the resolver can be taken to represent an angular increment of 2° of the spindle 11. Thus, each time the resolver 110 produces a "null" signal, the spindle 11 will have been rotated two degrees. Under this condition the resolver will be orientated with respect to the angular position of the spindle 11 in a manner that when the "0" reference position marks 120 on the spindle 11 and housing 10 are in exact registration the resolver 110 will be positioned so as to produce a "null" signal. Since the resolver 110 will produce 180 "null" signals for every revolution of the spindle 11, the control system must be alerted to the particular "null" signal that is related to the "0" reference position. To this end, a switch 122 is provided and is mounted on the shifter fork 75 by means of a bracket 124. The switch 122 is positioned so as to be actuated when the spindle 11 "0" reference mark 120 is within 1° of the "0" reference position mark 120 on the housing 10. For actuating the switch 122, a switch actuating dog 121 is disposed on the spindle 11 being secured thereon for angular adjustment. When the "servo" positioning drive mode is called for, either manually or automatically by signals obtained from the tape (not shown), the gear drive mechanism 65 will be operated to drive the spindle 11 via the hydraulic motor 50 at a relatively slow rate. As the shifter fork 75 moves axially rightwardly, as viewed in FIG. 3, to effect the driving engagement of the gear member 66 with the gear member 67, the switch 122 mounted on the shifter fork 75 will move with the latter to be in a position to be actuated by the dog 121. Thus, as the spindle 11 is rotated for location at the "0" reference, or "keylock" position, the dog 121 will rotate with the spindle 11. Since the dog 121 has been previously adjusted to a desired angular position with respect to the "0" reference position mark 120 on the spindle, the dog 121 will actuate the switch 122 at an angular position which is within 1° of the "0" reference position mark 120 on the housing 10. With the switch 122 actuated, a circuit will be completed along line L16, FIG. 4, to energize a relay 141. With the relay 141 energized, it will operate to condition a logic circuit (not shown) in the data input unit 150, FIG. 5, in well-known manner, so that the positioning control unit 151 will operate to position to spindle 11 to the next "null" signal produced by the resolver 110. Since the "0" reference position marks 120 and the particular desired resolver 110 "null" signal have been previously orientated, the motor 50 will be operated to drive the spindle 11 to the "0" reference position. With the spindle 11 at the "0" reference position, the resolver 110 will be positioned to produce the "null" signal and the servo valve will be operated to stop the operation of the motor 50.

As previously mentioned, the "0" reference position is an arbitrary position and can be established for any angular position desired. For example, it will be assumed that a new "0" reference position is desired which is to be displaced 45° in a clockwise direction, as viewed from the right of FIG. 1, from the "0" reference position mark 120 shown on the housing 10. To accomplish this, the spindle 11 will be rotated in a clockwise direction, as viewed from the right in FIG. 1, until the "0" reference mark 120 on the spindle 11 is exactly 45° from the "0" reference mark 120 on the housing 10. However, when the spindle 11 has been rotated 45°, the resolver 110 will not be producing a "null" signal because its stator will be displaced 1° past the "null" signal position. This is true, because, as previously mentioned, every revolution of the stator of the resolver 110 represents an incremental angular movement of 2° of the spindle 11. Thus, a "null" signal will be obtained only for every 2° of spindle rotation. Therefore, a "null" signal will be obtained from the resolver 110 at 44°. In order to make the new 45° "0" reference position correspond to the resolver "null" signal, the resolver housing (or stator) 110 must be bodily rotated 180°. With the resolver 110 adjusted so that its "null" signal corresponds to the newly established 45° "0" reference position, the dog 121 will be adjusted so that it will actuate the switch 122 at a position which is within 1° of the 45° "0" reference position.

Figure 4:
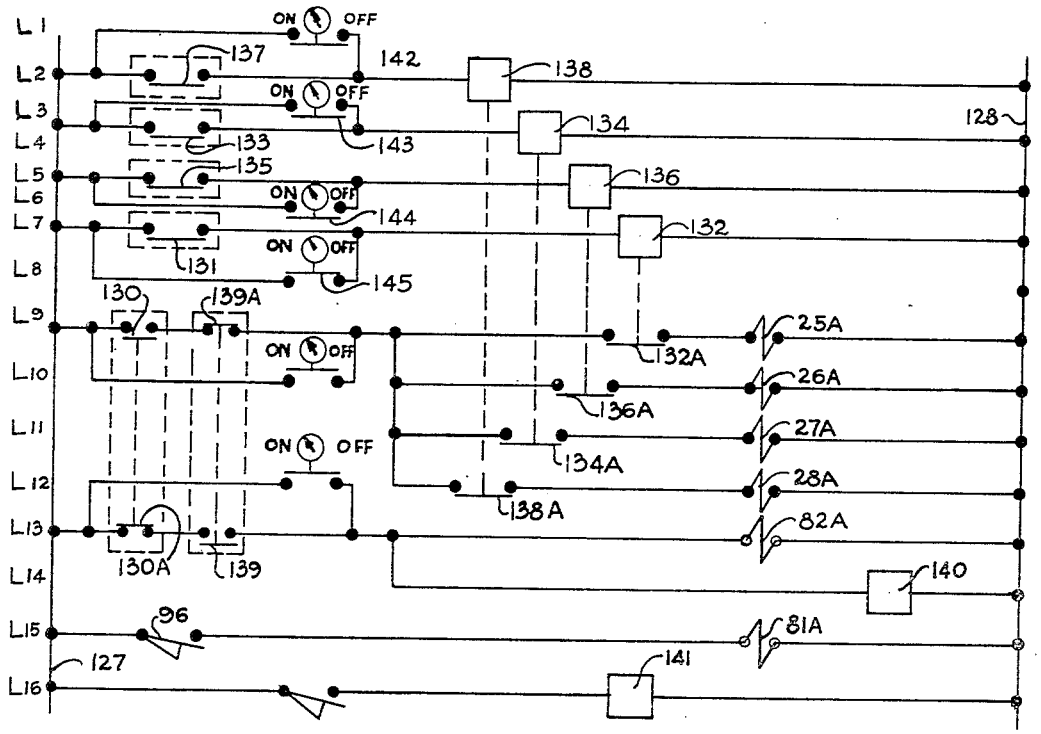
FIG. 4 is a schematic electrical circuit diagram showing a portion of the control circuit.

The electrical control circuit for effecting the operation of the drive clutches and of the various solenoid valves associated with the drive means of the workpiece spindle 11 "turning" and "servo" positioning modes, is schematically represented in FIG. 4. As there shown, the various horizontal control conductors, designated as L1 to L16, inclusive, are operatively interconnected between energized vertical conductors 127 and 128. The energized conductors 127 and 128 are connected to be energized from a source of power (not shown) by actuating switching means (not shown) in a well-known manner.

To initiate the "turning" mode of operation for the workpiece spindle 11, a coded input signal obtained from a source such as magnetic or punched tape (not shown) read by a tape reader (not shown) effects closure of a normally open automatic contact 130, line L9 in FIG. 4. The normally open automatic contact 130 is mechanically coupled to an associated normally closed contact 130A in line L13. Thus, with the normally open contact 130 moved to a closed position the associated normally closed contact 130A is moved to an open position thereby effectively preventing a circuit from being completed along line L13. To effect rotation of the workpiece spindle 11 in either a clockwise or counterclockwise direction, a signal from the tape (not shown) is obtained in a well-known manner to effect the closure of normally open automatic contact 131, line L7. Closure of the contact 131 operates to effect the energization of the drive clutch relay 132, line L7. With relay 132 energized its normally open contact 132A, in line L9, will close thereby completing the circuit from conductor 127 to 128 via line L9 to effect the energization of the drive clutch solenoid 25A. The energized clutch solenoid 25A will operate to effect the engagement of the drive clutch 20, as previously described. With the drive clutch 20 engaged, one or the other of the directional clutches, clockwise clutch 22 or counterclockwise clutch 21 will be selectively engaged to effect rotation of the workpiece spindle in the desired direction. Assuming that clockwise rotation of the workpiece spindle 11 has been programmed, a signal will be obtained from the tape (not shown) to effect closure of a normally open automatic contact 133, line L4, causing clockwise relay 134 to be energized. With the clockwise relay 134 energized its associated normally open contact 134A, line L11, will close. This will complete a circuit from line L9 along line L11 to vertical conductor 128 thereby effecting the energization of the clockwise solenoid 27A. As a result, the clockwise directional clutch 22 is engaged so that the spindle 11 is driven in a clockwise direction. On the other hand, to effect rotation of the spindle 11 in the counterclockwise direction, a signal from the tape (not shown) will operate to open automatic contact 133, line L4, causing the clockwise relay 134 to be deenergized and its associated clockwise directional clutch 22 will be disengaged. The drive clutch relay 132 will be maintained energized and the countercockwise clutch 21 will then be engaged. To this end, a signal is obtained from the tape (not shown), which will operate to effect closure of a normally open automatic contact 135, line L5. With the automatic contact 135 in closed position, a counterclockwise relay 136 will be energized. The energized relay 136 operates to move its associated contact 136A, line L10, to closed position. With the contact 136A in a closed position a circuit is completed to effect energization of the counterclockwise solenoid 26A. As a result, the clutch 21 is engaged so that the workpiece spindle 11 is driven in a counterclockwise direction.

The workpiece spindle 11 can also be operated at a creep-speed in automatic mode. To this end signals obtained from the tape (not shown) will operate to effect the operation of the automatic contacts 131, 133 and 135 to insure that they are returned to their normally open positions. With contacts 131, 133 and 135 in their normally open positions the drive clutch 20 and the directional clutches 21 and 22 will be disengaged. Another signal is also obtained from the tape (not shown) which will serve to effect the movement of the normally open automatic contact 137, line L2, to a closed position, resulting in the energizing of a creep relay 138, line L2. With the creep relay 138 energized, its associated contact 138A, line L12, will be moved to a closed position. As a result, a circuit will be completed along line L12 to effect the energization of the creep solenoid 28A. With the solenoid 28A energized the creep clutch 23 will be energized as previously mentioned and the work spindle 11 will be rotated at a creep speed.

When it is desired to rotate the work spindle 11 to the "zero" or "keylock" position, previously mentioned, the main spindle drive through the transmission 12, is disengaged and the servo angular positioning drive mode of operation is initiated. To this end, a signal is obtained from tape source (not shown) and it will effect the movement of a normally open automatic contact 139, line L13, to a closed position. Simultaneously, with the movement of the normally open contact 139 to a closed position an associated mechanically connected normally closed contact 139A, line L9, is moved to an open position to insure that the "turning" drive mode of operation cannot be initiated.

With the normally open automatic contact 139 in a closed position and with the interlocking contact 130A of the "turning" mode automatic contact in a closed position a circuit is completed to energize the servo motor run relay 140, in line L14. With the relay 140 energized it operates to provide a signal to the data input unit 150, shown in FIG. 5. This signal provided to the data input unit 150 operates to initiate the transmission of a command signal to the position control unit 151 for effecting the operation of the hydraulic motor 50 at a predetermined desired slow rate of speed.

Simultaneously with the energization of the motor run relay 140, the solenoid 82A associated with the control valve 82, previously described, is also energized. As a result, hydraulic fluid is supplied via port 87, FIG. 2, to the left side of the piston 83, where it acts on the piston surface 94. Since the area of the surface 94 is larger than the area of the surface 90 on the right side of the piston and since the hydraulic fluid supplied via ports 87 and 88 is at the same pressure, the force tending to move the piston rightwardly will be relatively larger than the force tending to urge the piston leftwardly. As a result, the piston 83 will move rightwardly within the cylinder 84, to thereby move the shifter fork 75 and the gear member 66 rightwardly. Rightward movement of the gear member 66 will serve to effect engagement between the axially rightwardly extending teeth 72 of the gear member 66 with the complementary axially leftwardly extending gear teeth 73 of the gear member 67. With the gear teeth 72 and 73 of the gear members 66 and 67, respectively, in complete meshing engagement the switch 96 will be actuated, as previously described. As a result, the switch contact 96A, in line L15 of FIG. 4, will be closed and a circuit will be completed to energize the solenoid 81A associated with the control valve 81. The valve 81 will operate to direct hydraulic fluid via port 86, to the extreme left end of the piston 83. The hydraulic fluid acting on the left end of the piston 83 will apply an additional rightwardly acting force on the piston thereby insuring that full meshed engagement between the gear members 66 and 67 will be maintained during the servo drive mode of operation.

Figure 5:
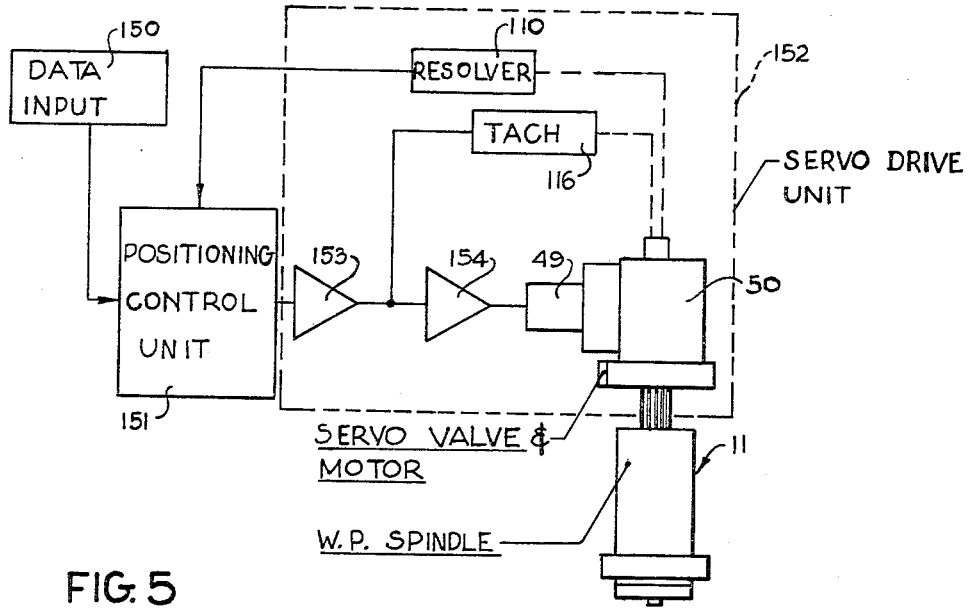
FIG. 5 is a schematic, block diagram illustrating the power control circuit for effecting an indexing movement of the workpiece spindle in response to the tape or manual input.

In addition to positioning the workpiece spindle 11 at the "0" or "keylock" position, the servo drive mode of operation is also utilized in cooperation with the control system, depicted in FIG. 5, to effect angular indexing movement of the spindle 11 into any desired angular position. In FIG. 5, the control system for effecting the positioning movement of the workpiece spindle 11 in an indexing movement is illustrated schematically in block diagram format. As therein shown, information from a source such as punch or magnetic tape (not shown), or by manual input initiated by the machine operator is transmitted to the data input unit 150. This is the data which is fed to the control to effect positioning of the workpiece spindle 11 in relationship to the tool operator (not shown), so that the workpiece spindle 11 will be located in the predetermined desired angular orientation position.

The desired angular position signal from the data input block 150 is one of the two signals that make up the input to the positioning control unit 151. The other signal is a position feedback signal from the resolver 110 which electrically indicates the instantaneous angular position of the workpiece spindle 11. The positioning control unit 151 operates to compare the signal from the data input 150 with the position feedback signal from the resolver 110 to produce an error signal in response to the discrepancy in the two signals. The error signal from the positioning control unit 151 is fed into a servo drive unit 152. The servo drive unit 152 includes a position-loop operational amplifier 153, a velocity-loop operational amplifier 154, a tachometer 116 feedback signal, the servo valve 49 and the hydraulic motor 50, which is used to rotate the workpiece spindle 11. The servo drive operates to effect the angular movement of the workpiece spindle 11 into an angular position as directed by the positioning control unit 151.

The output signal of the position-loop amplifier 153 produces the speed and direction command which is fed into the velocity-loop amplifier 154. The velocity-loop operational amplifier 154 has two inputs: the position command signal from the position-loop amplifier 153 and a feedback signal from the tachometer 116 which serves to improve the dynamic performance of the system. The speed of the motor 50 is directly proportional to the magnitude of the signal from the amplifier 154. On the other hand, the direction of rotation of the workpiece spindle 11 is controlled by the polarity of the signal.

To illustrate the operation of the servo drive in effecting an indexing movement of the spindle 11 it will be assumed that the workpiece spindle 11 is being driven in a "turning" mode of operation so that a turning operation is performed on the workpiece (not shown) carried by the spindle 11. However, the turning operation is only one of a plurality of operations to be accomplished and the next operation will be assumed to be a drilling operation. A plurality of different work operations may be performed on the workpiece (not shown) that is carried by the spindle 11 by the tool operator (not shown). It is also assumed that this drilling operation is one wherein a drilled opening must be made in the peripheral surface of the workpiece, the axis of which must be accurately located in a particular precise position with respect to a reference point on the workpiece. Since the workpiece spindle 11 is always stopped in the "0" or "keylock" position, the workpiece itself will be secured to the spindle 11 so that the reference point on the workpiece is exactly aligned with the "0" reference marks 120 on the spindle 11 and the housing 10. Thus, the spindle 11 may be indexed a precise angular distance with respect to the "0" reference mark to locate the precise position on the workpiece (not shown) in correct relationship to the axis of the tool operator.

To index the workpiece spindle 11 to a desired angular position, the servo drive mode is engaged as previously described. A signal will be obtained from the tape source (not shown) commanding a "0" or "keylock" positioning operation. With the workpiece spindle 11 positioned in the "0" or "keylock" position, as described above, the position and command registers (not shown) included in the data input unit 150, the operation and function of which are well-known, are set to zero. With the registers reset to zero, a signal of electrical pulses which are in binary-coded decimal form is obtained from the tape (not shown) which presets the command register (not shown) of the data input unit 150 to register a numerical count equivalent to the angular position to which it is desired to position the spindle 11. Simultaneously, pulses are transmitted to the position register (not shown) of the data input unit 150 and to positioning control unit 151. Each pulse transmitted to the positioning control unit 151 represents an angular increment of .002 degrees of spindle movement. These pulses, which are transmitted at a constant rate for a given velocity, are converted to electrical signals in the positioning control unit 151 in well-known manner, and are utilized to effect the operation of the servo valve 49 for controlling the operation of the hydraulic motor 50 to position the spindle 11 into the desired angular position. As the pulses are transmitted to the positioning control unit 151 and to the position register (not shown), the position register will operate to count and register the pulses being transmitted. The position register (not shown) makes a continuous comparison of the pulse input count with the count stored in the command register (not shown). When the count of the pulses transmitted to the position register equals the count stored in the command register, a balance is obtained, and the position register will operate to block the further transmittal of pulses to the position control unit 151 and to the position register. The servo valve 49 will have been operated to effect the regulation of the motor 50 to position the spindle 11 in the exact desired position, according to the number of pulses transmitted to the positioning control unit 151.

The rotation of the workpiece spindle 11 to effect its location at a predetermined angular "0" or "keylock" position and to index the spindle 11 to a desired angular location has been described in conjunction with automatic control means. However, the rotation of the spindle 11 may be effected manually by the machine operator actuating the "on" and "off" switches 142, 143, 144, 145, 146 and 147, shown in FIG. 4, in any combination and sequence as may be desired.

From the foregoing detailed description of the illustrated embodiment set forth herein to exemplify the present invention, it will be apparent that there has been provided a workpiece spindle drive arrangement which provides a transmission drive for a work performance of a work operation as well as an auxiliary servo drive for effecting the precise positioning of the spindle at an angular orientated reference position or at a desired index position.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the sub-joined claims.

The principle of this invention having now been fully explained in connection with the foregoing description, I hereby claim as my invention:

1. In a rotary spindle drive mechanism;
   a power means connected to rotate said spindle;
   control means connected to regulate the operation of said power means to stop said spindle in the same predetermined angular reference position upon each termination of its rotation, said control means being also responsive to data input to regulate the operation of said power means for rotating said spindle from said predetermined angular reference position to another selected angular position as designated by said data.

2. A rotary spindle drive mechanism according to claim 1 wherein said power means includes:
   a first source of power connected to rotate said spindle in a work operation;
   a second source of power connected to rotate said spindle in a positioning movement under the control said control means;
   first coupling means for connecting said first source of power to said spindle;
   second coupling means for connecting said second source of power to said spindle; and,
   means operable to disengage said first coupling means and to engage said second coupling means for actuating said spindle in a rotary positioning movement.

3. A rotary spindle drive mechanism according to claim 2 including:
   a dog carried by said spindle for rotation therewith; and,
   a switch movable with said second coupling means into position to be actuated by said dog for activating said control means to terminate rotation of said spindle when it arrives at said predetermined angular reference position.

4. A rotary spindle drive mechanism according to claim 1 wherein said control means includes:
   a switch connected to be actuated when the spindle is approaching the predetermined angular reference position and to condition said control means to position said spindle therein; and,
   a resolver connected to rotate with said spindle and to terminate rotation of said spindle when said resolver reaches its next null position after said switch has been actuated.

5. In a rotary spindle drive mechanism:
   power means connected to rotate said spindle;
   a servo system for regulating the rotary movement of spindle;
   means connected to actuate said servo system during the stopping of said spindle for stopping said spindle in the same predetermined angular reference position upon each termination of its rotation; and,
   signal means for activating said servo system for rotating said spindle from said predetermined angular reference position to another selected angular position.

6. A rotary spindle drive mechanism according to claim 5 wherein said servo system includes:
   data input means operable to supply a command signal;
   a servomotor operable for rotating said spindle in accord with said command signal;
   a resolver operatively driven by said spindle so as to produce feedback signals representing the angular positons of the spindle;
   positioning control means operable to produce an error signal in response to the difference between the command and feedback signal, to move said servomotor in a positioning movement.

7. A rotary spindle drive mechanism according to claim 5 wherein said means connected to actuate said servo system during the stopping of said spindle in the same predetermined angular reference position upon each termination of its rotation include:
   a switch; and,
   a dog for actuating said switch, said dog is carried for rotation in an angular path of travel with the spindle and in position to actuate said switch when the spindle has been rotated into approximate predetermined desired angular position.

8. In a rotary spindle drive mechanism adapted to rotate the spindle in a work operation and to position the spindle in a predetermined angular position upon termination of its rotation:
   first drive means connectible to rotate said spindle in a work operation;
   second drive means connectible to rotate said spindle in a positioning movement;
   means operable to connect said first drive means with said spindle for rotating the spindle in a work operation;
   coupling means actuatable to connect said second drive means to the spindle for rotating the spindle into a predetermined angular position while said first drive means is disconnected from the spindle, said coupling means includes a pair of complementary clutch drive members normally biased to a disengaged position relative to each other; and,
   actuator means operably connected to effect axial movement of said clutch drive members relative to each other to establish a rotatable driving connection therebetween.

9. A drive mechanism according to claim 8 wherein the first of said clutch drive members is secured in coaxial relationship to the spindle, said first member being provided with axially extending teeth that are spaced circumferentially about the face of said first member, said teeth being constructed so that they present a curved shape when viewed in a plane perpendicular to the axis of said first member; and,
   the second of said clutch drive members being constructed and arranged so as to be rotatably driven by the motor through a speed reduction transmission and to be axially movable relative to said first drive member, said second member being provided with axially extending teeth which are spaced circumferentially about the face of said second member, said teeth being constructed so that they present a curved shape when viewed in a plane perpendicular to the axis of said second member, said teeth of said second member being complementary to the teeth of said first drive member,
whereby the axial movement of said second member relative to said first member by operation of said actuator will serve to effect a precise driving engagement of the complementary teeth of said members, and said motor will operate to effect the rotation of the spindle a a relatively slow speed for locating the spindle in the precise predetermined desired angular position.

10. A drive mechanism according to claim 9 wherein said second of said clutch drive members is provided with an antifriction bearing, the outer race of said bearing being adapted for connection with a linear shifter member connected to be moved by said actuator for effecting the axial shifting movement of said second clutch drive member into and out of engagement with said first clutch drive member.

11. A drive mechanism according to claim 8 wherein said actuator means is operable to apply a first force in a direction to maintain said clutch drive members in disengaged positions, said actuator being operable to apply a second force to said clutch drive members opposite to the direction of action of said first force and of a relatively greater magnitude sufficient to overcome the effect of said first force and to move said clutch drive members relative to each other into driving engagement with each other, the magnitude of said second force being such as not to prevent the rotation of said clutch drive members relative to each other in the event that said drive members fail to engage upon the initial axial movement thereof, said actuator being also operable to apply a third force to said clutch drive members in the direction of action of said second force upon said clutch drive members being fully engaged, whereby said third force serves to insure that said clutch drive members are maintained in full driving engagement.

References Cited
UNITED STATES PATENTS

| | | | |
|---|---|---|---|
| 2,876,661 | 3/1959 | Jaeger | 74—825 X |
| 3,122,943 | 3/1964 | Coombs | 74—661 |
| 3,127,790 | 4/1964 | Howey | 74—661 |
| 3,264,903 | 8/1966 | Bonnafe | 74—825 |

LEONARD H. GERIN, Primary Examiner

U.S. Cl. X.R.

73—388, 661, 825

REEXAMINATION CERTIFICATE (708th)

United States Patent [19]

Schachte

[11] B1 3,483,767

[45] Certificate Issued  Jun. 23, 1987

[54] APPARATUS FOR ANGULARLY POSITIONING A SPINDLE

[75] Inventor: John J. Schachte, Wauwatosa, Wis.

[73] Assignee: Kearney & Trecker Corporation, West Allis, Wis.

Reexamination Request:
No. 90/000,943, Jan. 27, 1986

Reexamination Certificate for:
Patent No.: 3,483,767
Issued: Dec. 16, 1969
Appl. No.: 667,993
Filed: Sep. 15, 1967

[51] Int. Cl.⁴ .................. B23B 19/02; B23B 29/24; F16H 35/06; F16H 37/06
[52] U.S. Cl. .................. 74/395; 74/388 R; 74/661; 74/825; 82/28 B
[58] Field of Search ............. 82/34 D, 36 A, DIG. 4, 82/DIG. 7, 28 B; 318/605, 628, 661, 665, 672, 673; 408/3, 5, 13

[56] References Cited

U.S. PATENT DOCUMENTS

| | | | |
|---|---|---|---|
| 2,330,985 | 10/1943 | Meyer | 192/139 |
| 2,441,291 | 5/1948 | Rivoira | 318/301 |
| 2,689,413 | 9/1954 | Kachuck | 34/77 |
| 2,753,502 | 7/1956 | Kylin | 318/265 |
| 2,790,280 | 4/1957 | Wilson et al. | 51/237 |
| 2,876,661 | 3/1959 | Jaeger | 74/821 |
| 3,122,943 | 3/1964 | Coombs | 74/661 |
| 3,127,790 | 4/1964 | Howey | 74/661 |
| 3,264,903 | 8/1966 | Bonnafe | 74/825 |

FOREIGN PATENT DOCUMENTS

| | | |
|---|---|---|
| 648809 | 7/1937 | Fed. Rep. of Germany . |
| 831475 | 2/1952 | Fed. Rep. of Germany . |
| 890420 | 8/1953 | Fed. Rep. of Germany . |
| 348995 | 12/1960 | Switzerland . |
| 898598 | 6/1962 | United Kingdom . |
| 929454 | 6/1963 | United Kingdom . |
| 1093196 | 12/1967 | United Kingdom . |
| 1101292 | 1/1968 | United Kingdom . |
| 1106179 | 3/1968 | United Kingdom . |

OTHER PUBLICATIONS

Article appearing in British "Machinery and Production Engineering" magazine published Apr. 12, 1961 entitled Electro-Hydraulic Pulsed Control System by D. McNaught and R. Walters.

Primary Examiner—Lawrence J. Staab

[57] ABSTRACT

An apparatus for angularly orienting a rotary spindle in a predetermined position upon discontinuation of its rotation. A conventional drive mechanism is provided for rotating the spindle in a work operation but a separate servo drive takes over from the work drive to effect the angular positioning of the spindle.

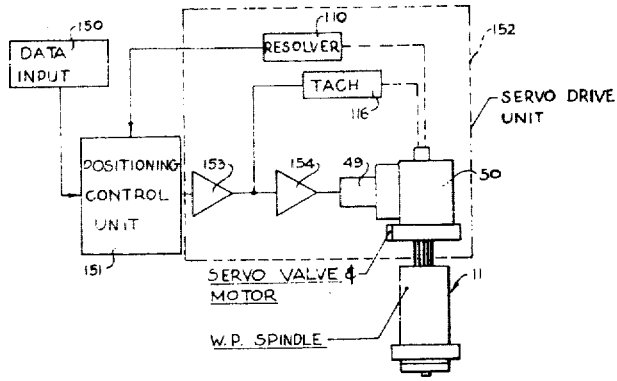

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 4 is confirmed.

Claims 1-3 and 5-11 are cancelled.

* * * * *